Figure 1:
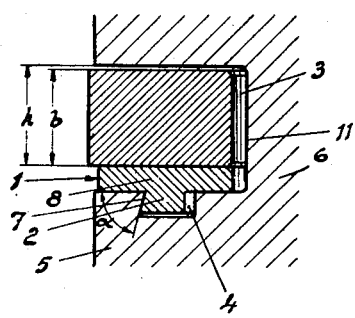

INVENTOR.
Håkan Åberg () # United States Patent Office 2,919,965
Patented Jan. 5, 1960

2,919,965

WEAR PISTON RING FOR PISTON ENGINES, ESPECIALLY FAST MOVING INTERNAL COMBUSTION ENGINES

Håkan Åberg, Goteborg C, Sweden, assignor to AB Davy Robertsons Maskinfabrik, Goteborg, Sweden, a corporation of Sweden Application June 13, 1958, Serial No. 741,886

Claims priority, application Sweden June 15, 1957

5 Claims. (Cl. 309—44)

The side surfaces of the ring grooves in pistons moving up and down, especially the lower side surfaces, of internal combustion engines—at very fast moving engines also the upper side surfaces—are exposed to a very hard wearing. As the piston rings in worn ring grooves only can act incompletely and finally cease to function, the pistons due to this wearing will be unusable. In order to render these rather expensive details usable again, the ringformed side surfaces of the grooves have previously been provided with wear rings whereby the initial height of the groove has been regained and the piston rings have recovered their normal working conditions and again worked with a normal appropriate axial play.

Such wear rings are often provided already in new pistons, especially where the material of the piston rings in an unfavourable way cooperates with the material of the pistons and where for this reason too hard a wearing is to be expected.

The wear rings are thereby manufactured as flat rings with rectangular cross section or as rings having an L-formed or a T-formed cross section, whereas the rather short stem of the L or the T engages a corresponding notch in the groove side of the piston. The rings are as a rule attached to said surface by soldering or spot welding, i.e. when the material of the pistons permit such a process.

In connection with fast moving piston engines and especially in connection with light metal pistons which do not permit an attachment by means of soldering etc., the support surface will because of the mass forces acting in radial and axial direction rather soon be hammered out whereby the pistons become unusable as stated above.

Attempts have been made to manufacture wear rings in several sections each of these sections having an L-shaped cross section. The outside of the stem extending from the support surface of the ring encloses an acute angle with said support surface. Said stem thus rests with its said inclining outside against the correspondingly inclining inside of a notch in the groove side in question of the piston. In order to be kept in their notch at the movement of the piston, separate sections of the wear ring must be pressed outwardly by means of a springing element situated at the inside of the ring. However, separately arranged springing elements have turned out to be unfavourable especially when situated in the vicinity of the combustion chamber of a piston engine. Such elements do not only require a considerable space and consequently a larger groove which decreases the strength of the piston wall in an unfavourable degree, but their springing properties will be considerably decreased because of the high temperatures in the vicinity of the combustion chamber and said elements thus made ineffective. The increasing of the dimensions of the groove, necessary for the insertion of the springing element, decreases also considerably the resting or support surface and consequently, the groove has to be taken up deeper into the piston than otherwise necessary and thus there will be a greater risk for break in the piston.

The present invention relates first of all to the last mentioned type of wear rings and has for its object to provide a wear ring having an L- or T-shaped cross section and being manufactured of cast iron, steel, bronze, or other suitable material for piston engines, especially fast moving internal combustion engines and for light metal pistons, the stem extending from the support surface of the ring enclosing with its outside an acute angle with said support surface, said stem with its inclining outside resting against the inner side, inclining with the same angle as the outside of the stem, of a notch arranged in the groove side in question of the piston. The main feature of the invention is that the wear ring is self-tensioning and the value of its self-tension is so high that a lifting away of the ring from the corresponding groove side and thus a hammering out of surface or the wear ring is prevented.

The invention will now be elucidated with reference had to the accompanying drawing. In the drawing:

Figures 1 to 6 show in cross section some embodiments of wear rings according to the invention; the said invention not being restricted to these embodiments.

Figure 2:
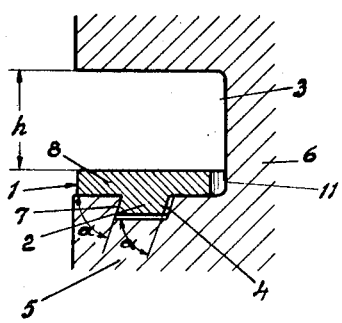

According to Figs. 1–6, the wear ring is formed in such a way that it is given an essentially T-shaped cross section. The radially outer surface of the T-stem, as shown in Fig. 1, or its outer and inner surface as shown in Fig. 2, encloses an acute angle $\alpha$ with the ring axis.

The wear ring 1 is formed as a self-tensioning ring and is arranged in the side surface of the ring groove 3 in such a way that it with its short vertical stem 2 rests in a notch 4 in one of the side surfaces 5 of the groove of the piston 6 with its inclining, radially outer surface forced against a notch surface 7, inclining with the same angle $\alpha$. The tension of the ring is chosen so high that the inclining, outer side surface of the T-stem 2 and the occurring friction prevent a lifting of the ring with the horizontal flange 8 from the lower side of the notch under influence of the mass forces.

If both the outer and inner sides of the T-stem incline with the angle $\alpha$, this involves the advantages that the notch 4 for engagement of the T-stem in the side wall 5 of the piston 6 could be made more narrow and the piston thus be less weakened.

Figure 4:
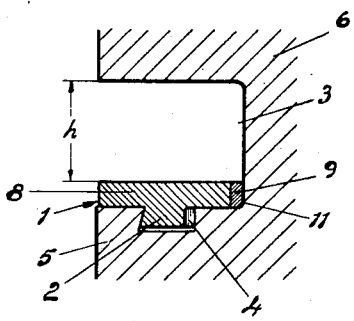
Figure 5:
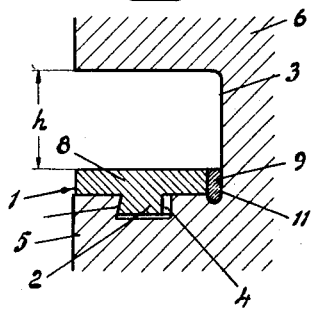
Figure 3:
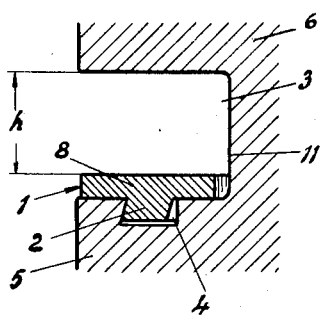
Figure 6:
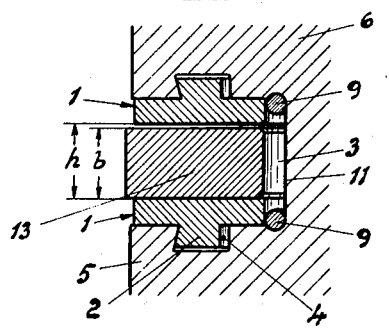

In order to prevent the wear ring from "jumping" out of its prescribed position, it is according to the embodiments shown in Figs. 4–6 also possible to arrange filling rings 9 which could either have no clamping effect at all or like the wear ring 1 spring outwardly and press the latter radially outwards.

The wear ring may, at will, be manufactured of cast iron, of a suitable steel, of bronze or other material. The end surface of the wear ring 1 cooperating with the piston ring 13 may in a way known per se be protected from wearing by being plated with an appropriate metal, e.g. by hard chromating or other finishing method known per se.

If there is any risk in fast moving engines that both of the side surfaces of the groove be hammered out due to the mass forces of the piston ring, said two side surfaces could according to Fig. 6 be provided with wear rings of described kind.

In the drawing, the height of the groove is designated with $h$ and the width of the piston ring with $b$. The normal axial play is thus $h-b$, and this value is not increased when wear rings according to the invention are provided.

The invention has here above been described when used in piston engines having pistons running up and down but it could of course be used with same advantages in engines in which the pistons move in a horizontal or in a somewhat inclined plane.

What I claim is:

1. A wear piston ring manufactured of cast iron, steel, bronze, or another suitable metal for piston engines, especially fast moving internal combustion engines, and for light metal pistons, said ring adapted to be inserted in a piston groove and having a T-shaped cross section the stem of said T-shaped cross section extending from the support surface of the ring and enclosing an acute angle with said supporting surface and said stem resting with its inclining outside against the inside, inclining with the same angle, of a notch arranged in the groove of the piston, the ring being self-tensioning and the value of its self-tension being chosen high enough to prevent a lifting away of the ring from said side of the groove and thus a hammering out of this groove side as well as of the wear piston ring being prevented.

2. A wear piston ring manufactured of cast iron, steel, bronze, or another suitable metal for piston engines, especially fast moving internal combustion engines, and for light metal pistons, said ring adapted to be inserted in a piston groove and having a T-shaped cross section the stem of said T-shaped cross section extending from the support surface of the ring and enclosing an acute angle with said supporting surface and said stem resting with its inclining outside against the inside, inclining with the same angle, of a notch arranged in the groove of the piston, the ring being self-tensioning and the value of its self-tension being chosen high enough to prevent a lifting away of the ring from said side of the groove and thus a hammering out of this groove side as well as of the wear piston ring being prevented, the inner surface of said stem being approximately parallel with said outer surface of the same, the notch for engagement with said stem having parallel side surfaces, inclining with same angle as said surfaces of said stem.

3. A wear piston ring manufactured of cast iron, steel, bronze, or another suitable metal for piston engines, especially fast moving internal combustion engines, and for light metal pistons, said ring adapted to be inserted in a piston groove and having a T-shaped cross section the stem of said T-shaped cross section extending from the support surface of the ring and enclosing an acute angle with said supporting surface and said stem resting with its inclining outside against the inside, inclining with the same angle, of a notch arranged in the groove of the piston, the ring being self-tensioning and the value of its self-tension being chosen high enough to prevent a lifting away of the ring from said side of the groove and thus a hammering out of this groove side as well as of the wear piston ring being prevented, the play between said wear piston ring and the bottom of the groove in the wall of the piston being filled up with a filling ring having no tension or springing outwardly.

4. A wear piston ring manufactured of cast iron, steel, bronze, or another suitable metal for piston engines, especially fast moving internal combustion engines, and for light metal pistons, said ring adapted to be inserted in a piston groove and having a T-shaped cross section the stem of said T-shaped cross section extending from the support surface of the ring and enclosing an acute angle with said supporting surface and said stem resting with its inclining outside against the inside, inclining with the same angle, of a notch arranged in the groove of the piston, the ring being self-tensioning and the value of its self-tension being chosen high enough to prevent a lifting away of the ring from said side of the groove and thus a hammering out of this groove side as well as of the wear piston ring being prevented, the supporting surface of said ring being hard chromated.

5. A wear piston ring manufactured of cast iron, steel, bronze, or another suitable metal for piston engines, especially fast moving internal combustion engines, and for light metal pistons, said ring adapted to be inserted in a piston groove and having a T-shaped cross section the stem of said T-shaped cross section extending from the support surface of the ring and enclosing an acute angle with said supporting surface and said stem resting with its inclining outside against the inside, inclining with the same angle, of a notch arranged in the groove of piston, the ring being self-tensioning and the value of its self-tension being chosen high enough to prevent a lifting away of the ring from said side of the groove and thus a hammering out of this groove side as well as of the wear piston ring being prevented, such a wear piston ring being arranged in the upper side surface of said groove in the piston wall as well as in its lower side surface when required by stresses of the side surfaces of the groove.

References Cited in the file of this patent

UNITED STATES PATENTS

| | | |
|---|---|---|
| 1,667,941 | Madsen | May 1, 1928 |

FOREIGN PATENTS

| | | |
|---|---|---|
| 401,085 | Great Britain | Nov. 9, 1933 |
| 585,284 | Great Britain | Feb. 4, 1947 |
| 654,804 | Great Britain | June 27, 1951 |
| 619,563 | Germany | Oct. 3, 1935 |